United States Patent [19]

Segerstad et al.

[11] Patent Number: 4,979,179
[45] Date of Patent: Dec. 18, 1990

[54] DIVIDED HOLLOW CATHODE LASER

[76] Inventors: Sverker H. A. Segerstad, Langasliden 28, S-412 70; Charlotte Carlsson, Riddaregatan 21 N, S-416 69, both of Goteborg, Sweden; Jerzy Mizeraczyk, Jana Hus 9,, Gdansk Oliwa, Poland

[21] Appl. No.: 465,128

[22] PCT Filed: Aug. 24, 1988

[86] PCT No.: PCT/SE88/00431
§ 371 Date: Feb. 22, 1990
§ 102(e) Date: Feb. 22, 1990

[87] PCT Pub. No.: WO89/02173
PCT Pub. Date: Mar. 9, 1989

[30] Foreign Application Priority Data

Aug. 24, 1987 [SE] Sweden .................. 8703289

[51] Int. Cl.$^5$ .................................... H01S 3/97
[52] U.S. Cl. ......................... 372/88; 372/56; 372/61; 372/62
[58] Field of Search .......... 372/88, 62, 56, 61, 372/87, 59

[56] References Cited

U.S. PATENT DOCUMENTS

| 3,792,373 | 2/1974 | Altman et al. | 372/61 |
| 4,255,720 | 3/1981 | Wang et al. | 372/88 |
| 4,287,484 | 9/1981 | Wang et al. | 372/88 |
| 4,380,078 | 4/1983 | Wang et al. | 372/88 |

FOREIGN PATENT DOCUMENTS 200587 11/1983 Japan ........................ 372/62

Primary Examiner—Frank Gonzalez
Assistant Examiner—Susan S. Morse
Attorney, Agent, or Firm—Osterlenk, Faber, Gerb & Soffen

[57] ABSTRACT

An improved electrode design for reducing discharge instability, especially in white light lasers. The apparatus consists of at least one cathode electrode (12) arranged between anode electrodes (14), said cathode being divided into two equally long tube parts (15) designed with inner cylindrical electrode surfaces ($A_1$, $A_2$) between which a widened portion (16) is located and each anode electrode is connected via and insulator (13) to the end of each tube part (15) facing away from the widened portion. This widened portion of the cathode serves to divide the cathode which in turn stablized the current and the current density. It can also serve as a metal reservoir.

8 Claims, 2 Drawing Sheets

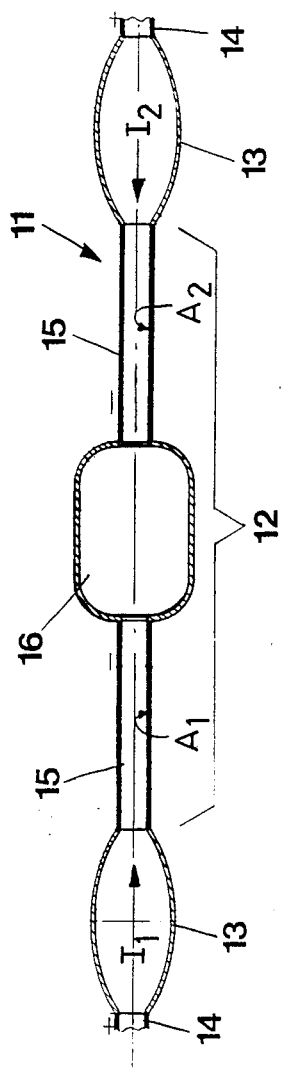
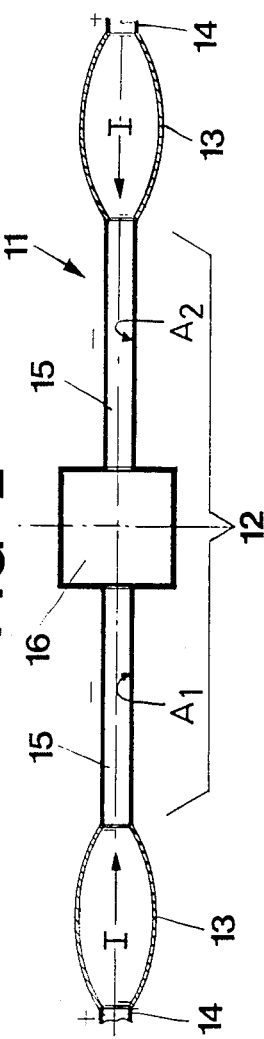

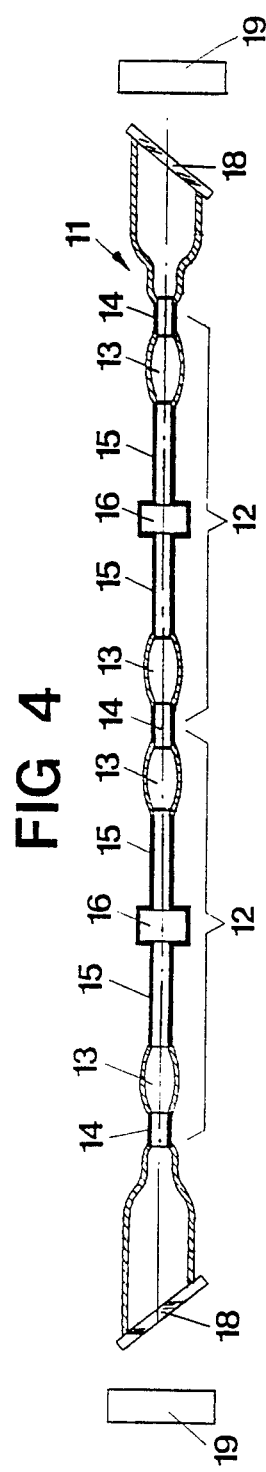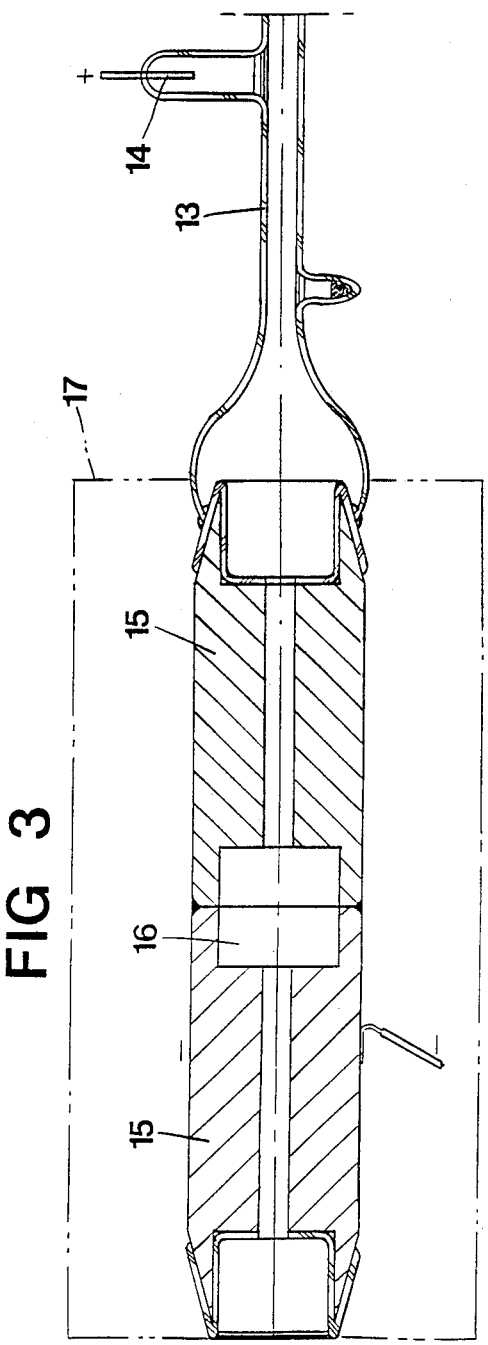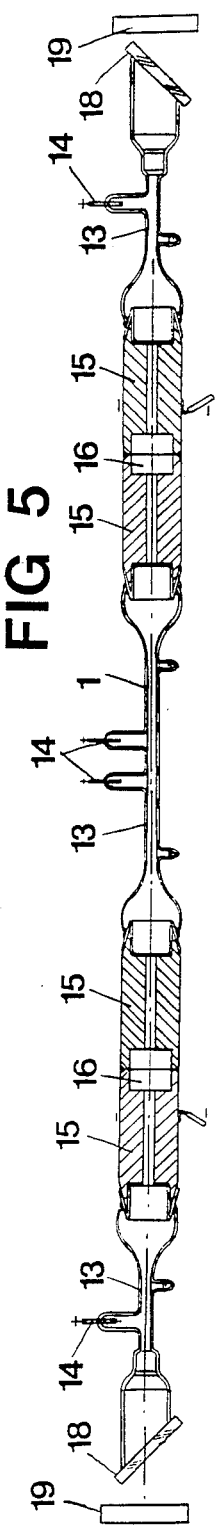

DIVIDED HOLLOW CATHODE LASER

BACKGROUND OF THE INVENTION

The present invention refers to a device in gas lasers, especially so called white light lasers and of the kind which at one hand comprises at least one gas discharge tube in the form of an electrode segment comprising at least one cathode electrode arranged between anode electrodes, the electrode surfaces of said cathode electrode being exposed to the gas and on the other hand comprises end members enclosing the gaseous medium within the segment.

Hollow cathode lasers are a special type of gas lasers in which the active area consists of the negative plasma glow. The lazing substance is often a metal ion excited in a rare-gas plasma, but lazing in pure rare-gas mixtures also occurs. Of special interest are He-Cd hollow cathode lasers, since they can laze continuously and simultaneously in red, green and blue. Such lasers, so called white light lasers, are interesting i.a. at handling of colour pictures.

Many constructions of white gas lasers have been tested, but yet there are none that are commercially available. This probably depends on life- and instability problems. The life limit is primarily caused by the fact that the metal vapour is diffused from the active areas and e.g. is deposited on the Brewster window or—if such are missing on—the laser mirrors. The instability of laser output is primarily caused by plasma instabilities. These are generated e.g. by temperature gradients in the laser, geometry deficiencies and presence of undesired substances in the laser cavity.

OBJECT AND MOST IMPORTANT FEATURES OF THE INVENTION

The object of the invention is primarily to provide a gas laser which substantially reduces the discharge instability problems, at which an increase and stabilization of the output of the laser is achieved. At the same time known positive effects should be maintained, such as keeping the metal vapour in the active area of the gas discharge tube, so that a decontamination of its end sealing means and laser mirrors respectively does not occur or only to a slight exent. The diffusion of the metal vapours can also in this way be considerably reduced. This has been provided by the fact that the cathode electrode between the anode electrodes is divided in two preferably essentially equally long tube parts designed with inner, cylindrical electrode surfaces, that between the tube parts there is arranged a widened portion which leads to the tube parts, and that an anode electrode is via an insulator connected to the end of each tube part facing away from the widened portion.

DESCRIPTION OF THE DRAWINGS

The invention will below be closer described with reference to some embodiments.

FIG. 1 is a section through a very schematically shown laser electrode segment according to the invention.

FIG. 2 is a section analogous with FIG. 1 of a modified laser electrode segment.

FIG. 3 shows a section through a laboratory embodiment of the laser electrode segment schematically shown in FIG. 2.

FIG. 4 shows a section through the schematic construction of two electrode segments according to the invention connected in series.

FIG. 5 shows the arrangement according to FIG. 4 in more complete construction.

DESCRIPTION OF EMBODIMENTS

The invention presents a special design of a hollow cathode laser tube. An important component in the laser is the cylindrical electrode segment 11, which is schematically shown in FIG. 1 and 2. A laser tube can comprise one such segment, shown in FIGS. 1-3 or several such segments connected in series as is shown in FIGS. 4 and 5. In order to provide a functioning laser there are also required laser mirrors 19, electric power unit, mechanical holders, possible cooling/heating control 17 and other control electronics etc., which details are not shown since they are well-known in the art.

The laser electrode segment 11 according to the invention consists of a cathode electrode, generally denoted 12, to both ends of which there are connected insulators 13, which in turn are provided with an anode 14 each.

The cathode 12 can, as is shown in FIG. 1, consist of two substantially equally long, cylindric tube parts 15 and a widened portion 16 located therebetween, which in the embodiment shown in FIG. 1 consists of an electrically insulated cover, while in the embodiment shown in FIG. 2 the widened portion 16 consists of a cover of an electrically conducting material.

In reality the cathode 12 can consist of a solid piece of metal, e.g. a so called Kovar metal, or of several parts joined to one piece, as is shown in FIG. 3. To both ends of the cathode 12 there is attached a glass insulator 13 each, in which also the anode 14 is attached. The electrode surfaces $A_1$, $A_2$ of the anode as well as the cathode are exposed to the gas in the electrode segment 11. In order to enclose the gaseous medium in the gas discharge tube, i.e. the electrode segment 11, this is at the ends closed by appropriate end members, e.g. so called Brewster windows 18, outside which the laser mirrors 19 are arranged in a conventional way. The anode- and cathode electrodes 12, 14 are connected to an electric power source, e.g. a direct-current source.

In case a metal ion is the lazing substance (as e.g. He-Cd lasers) the wider portion 16 serves preferably as a metal reservoir. The cathode 12 receives current from the two anodes 14, which are located on either sides of the cathode. The cathode is further arranged so that the temperature along its entire length is constant, in order to provide a good plasma stability. A way to provide this temperature constancy is that the cathode is manufactured of a solid material, which can equalize temperature variations. When an electric discharge is driven between the anodes and the cathode, the outer parts of the cathode are heated most, since these parts receive the currents from the anodes. The widened portion 16 is then also heated automatically through heat conduction towards the centre of the cathode, which is needed for obtaining a sufficient metal vapour pressure in the hollow space of the cathode in order for lazing to take place (e.g. in the He-Cd laser case). It is also possible to provide an even cathode temperature by placing the entire cathode within a separate container 17, the temperature of which can be regulated.

The widened portion of the cathode 16 has the important quality that it "divides" the cathode, so that each part 15 only receives current from the anode 14 that is closest. By that the currents I1, I2 as well as the current densities:

$$\frac{I_1}{A_1} \text{ and } \frac{I_2}{A_2}$$

will be equal and stable, which is very important for the lazing process. By the fact that the anodes 14 are placed on both sides of the cathode 12 the two positive plasma columns, which are formed between each of the anode and cathode in an electrode segment, will keep the metal vapour trapped in the hollow space of the cathode (electrical end osmose). In the case of metal vapour lasers one avoids separate external metal containers with this invention, since these can be arranged internally either in the wider portion 16 or in a special container located in the insulator 13 between the anode and cathode. A high and stable laser output is further obtained.

We claim:

1. A device in gas lasers, especially white light lasers and of the kind which comprises at least one gas discharge tube in the form of an electrode segment (11) comprising at least one cathode electrode (12) arranged between anode electrodes (14), the electrode surfaces of said cathode electrode being exposed to gas and end members (18) enclosing a gaseous medium within the segment (11) characterized in, that the cathode electrode (12) between the anode electrodes (14) is divided in two preferably essentially equally long tube parts (15) designed with inner, cylindrical electrode surfaces ($A_1$, $A_2$), that between the tube parts there is arranged a widened portion (16) which leads to the tube parts (15), and that an anode electrode (14) is via an insulator (13) connected to the end of each tube part (15) facing away from the widened portion.

2. A device as claimed in claim 1, characterized in, that several electrode segments (11) are axially connected in series to each other, and in which each segment is provided with a set each of cathode and anode electrodes (12,14).

3. A device as claimed in claim 1, characterized in, that the tube parts (15) and the widened portion (16) are produced from a solid piece of metal or from parts joined to one piece.

4. A device as claimed in claim 1, characterized in, that the widened portion (16) of the cathode (12) is produced of an electrically insulating material.

5. A device as claimed in claim 1, characterized in, that the widened portion (16) is a metal reservoir.

6. A device as claimed in claim 1, characterized in, that means (17) are arranged for keeping the temperature of the cathode (12) constant.

7. A device as claimed in claim 2, characterized in, that the tube parts and the widened portion are produced from a solid piece of metal or from parts joined to one piece.

8. A device as claimed in claim 2, characterized in, that the widened portion of the cathode is produced of an electrically insulating material.

* * * * *